United States Patent
Hasegawa et al.

(10) Patent No.: US 10,468,714 B2
(45) Date of Patent: Nov. 5, 2019

(54) NONAQUEOUS ELECTROLYTE SECONDARY BATTERY

(71) Applicant: SANYO Electric Co., Ltd., Daito-shi, Osaka (JP)

(72) Inventors: Kazuhiro Hasegawa, Hyogo (JP); Koichi Kusagawa, Osaka (JP); Akira Nagasaki, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/547,600

(22) PCT Filed: Feb. 22, 2016

(86) PCT No.: PCT/JP2016/000921
§ 371 (c)(1),
(2) Date: Jul. 31, 2017

(87) PCT Pub. No.: WO2016/136227
PCT Pub. Date: Sep. 1, 2016

(65) Prior Publication Data
US 2018/0026298 A1    Jan. 25, 2018

(30) Foreign Application Priority Data

Feb. 27, 2015 (JP) .................... 2015-038618

(51) Int. Cl.
*H01M 4/00* (2006.01)
*H01M 10/0525* (2010.01)
(Continued)

(52) U.S. Cl.
CPC ....... *H01M 10/0525* (2013.01); *H01M 4/133* (2013.01); *H01M 4/364* (2013.01);
(Continued)

(58) Field of Classification Search
CPC ............. H01M 4/525; H01M 10/0525; H01M 10/0587; H01M 4/587; H01M 4/133
See application file for complete search history.

(56) References Cited

U.S. PATENT DOCUMENTS

| 2006/0286457 A1 | 12/2006 | Sasaki |
| 2014/0349180 A1* | 11/2014 | Kim ............... H01M 4/366 429/211 |

FOREIGN PATENT DOCUMENTS

| CN | 1890826 A | 1/2007 |
| JP | 2001-110453 A | 4/2001 |

(Continued)

OTHER PUBLICATIONS

International Search Report dated May 10, 2016, issued in counterpart International Application No. PCT/JP2016/000921 (1 page).
(Continued)

*Primary Examiner* — Cynthia H Kelly
*Assistant Examiner* — Monique M Wills
(74) *Attorney, Agent, or Firm* — Westerman, Hattori, Daniels & Adrian, LLP

(57) ABSTRACT

A nonaqueous electrolyte secondary battery including a positive electrode plate including a positive electrode current collector and a positive electrode mixture layer, formed thereon, containing a positive electrode active material; a negative electrode plate including a negative electrode current collector and a negative electrode mixture layer, formed thereon, containing a negative electrode active material; a separator: a nonaqueous electrolyte; an outer can; and a sealing body. The positive electrode and negative electrode plates are wound with the separator there between. The positive electrode active material contains a lithium-nickel composite oxide containing cobalt and aluminum as constituent elements. The negative electrode active material contains graphite and a silicon material. The negative electrode plate includes negative electrode current collector-exposed portions, located at both ends thereof in a longitudinal direction, not covered by the negative electrode (Continued)

mixture layer. The negative electrode current collector-exposed portions are each connected to a negative electrode tab.

8 Claims, 1 Drawing Sheet

(51) Int. Cl.
 H01M 4/133 (2010.01)
 H01M 4/525 (2010.01)
 H01M 10/0587 (2010.01)
 H01M 4/36 (2006.01)
 H01M 4/38 (2006.01)
 H01M 4/48 (2010.01)
 H01M 4/587 (2010.01)

(52) U.S. Cl.
 CPC ........... *H01M 4/386* (2013.01); *H01M 4/483* (2013.01); *H01M 4/525* (2013.01); *H01M 4/587* (2013.01); *H01M 10/0587* (2013.01); *Y02T 10/7011* (2013.01)

(56) References Cited

U.S. PATENT DOCUMENTS

| | | | |
|---|---|---|---|
| 2015/0243971 A1* | 8/2015 | Cho | H01M 4/366 429/223 |
| 2015/0280208 A1* | 10/2015 | Kimura | H01M 4/0435 429/217 |
| 2015/0295276 A1* | 10/2015 | Ishiji | H01M 10/052 429/188 |

FOREIGN PATENT DOCUMENTS

| | | | | |
|---|---|---|---|---|
| JP | 2010-212228 A | 9/2010 | | |
| JP | 4533822 B2 * | 9/2010 | ............ | H01M 4/131 |
| JP | 2013-254639 A | 12/2013 | | |
| JP | 2014-146481 A | 8/2014 | | |

OTHER PUBLICATIONS

English Translation of Chinese Search Report dated Aug. 5, 2019, issued in counterpart CN application No. 201680012172.8. (2 pages).

* cited by examiner

NONAQUEOUS ELECTROLYTE SECONDARY BATTERY

TECHNICAL FIELD

The present invention relates to a nonaqueous electrolyte secondary battery including a negative electrode plate which contains graphite and a silicon material as negative electrode active materials and which has two ends each connected to a negative electrode tab.

BACKGROUND ART

In recent years, nonaqueous electrolyte secondary batteries have been widely used as power supplies for driving portable electronic devices such as smartphones, tablet computers, notebook personal computers, and portable music players. Furthermore, applications of the nonaqueous electrolyte secondary batteries extend to electric tools, power-assisted bicycles, and electric vehicles; hence, the nonaqueous electrolyte secondary batteries are required to have high capacity and high output.

A carbon material such as graphite is used as a negative electrode active material for the nonaqueous electrolyte secondary batteries. The carbon material has a discharge potential comparable to that of metallic lithium and can suppress the dendritic growth of lithium during charge. Therefore, using the carbon material as a negative electrode active material enables nonaqueous electrolyte secondary batteries excellent in safety to be provided. Graphite can store lithium ions to form the composition $LiC_6$ and exhibits a theoretical capacity of 372 mAh/g.

However, carbon materials currently used already exhibit a capacity close to the theoretical capacity thereof; hence, it is difficult to increase the capacity of nonaqueous electrolyte secondary batteries by improving negative electrode active materials. Therefore, in recent years, silicon materials, such as silicon and oxides thereof, having a capacity higher than that of the carbon materials have been attracting attention as negative electrode active materials for nonaqueous electrolyte secondary batteries. For example, silicon can store lithium ions to form the composition $Li_{4.4}Si$ and exhibits a theoretical capacity of 4,200 mAh/g. Therefore, using the silicon materials as negative electrode active materials allows nonaqueous electrolyte secondary batteries to have increased capacity.

The silicon materials, as well as the carbon materials, can suppress the dendritic growth of lithium during charge. However, the silicon materials show a larger change in volume due to charge and discharge as compared to the carbon materials and therefore have a problem of inferior cycle characteristics because of the pulverization of negative electrode active materials, the peel-off from conductive networks, or the like.

Patent Literature 1 discloses a nonaqueous electrolyte secondary battery including a negative electrode mixture layer containing a material containing Si and O as constituent elements and graphite as negative electrode active materials and a positive electrode mixture layer containing a lithium-transition metal composite oxide in which Ni, Mn, and the like are essential constituent elements as a positive electrode active material. It is reported that a nonaqueous electrolyte secondary battery having high capacity and good battery characteristics is obtained by regulating the proportion of the material containing Si and O as constituent elements in a predetermined range.

As a technique for enhancing output characteristics of a nonaqueous electrolyte secondary battery, Patent Literature 2 discloses that negative electrode tabs are connected to regions, set at both ends of a negative electrode plate of the nonaqueous electrolyte secondary battery, uncoated with a negative electrode active material.

CITATION LIST

Patent Literatures

PTL 1: Japanese Published Unexamined Patent Application No. 2010-212228
PTL 2: Japanese Published Unexamined Patent Application No. 2001-110453

SUMMARY OF INVENTION

Technical Problem

The inventors have performed investigations and have found a problem that in the case of using silicon oxide as a negative electrode active material, connecting a negative electrode tab to each of both ends of a negative electrode plate reduces cycle characteristics. The inventors have investigated the cause thereof and have found that an electrode assembly is deformed due to charge/discharge cycles. It is conceivable that the deformation of the electrode assembly inhibits a uniform electrode reaction to reduce the cycle characteristics. This is a problem common to not only silicon but also silicon materials containing silicon.

Negative electrode tabs connected to negative electrode plates are electrically connected to negative electrode external terminals. In the case of a cylindrical battery, an outer can functions as a negative electrode external terminal and therefore negative electrode tabs connected to both ends of a negative electrode plate are fixed to a bottom portion of the outer can. That is, both ends of the negative electrode plate are fixed by the outer can and therefore an electrode assembly is likely to be deformed because of the change in volume of a negative electrode active material due to charge or discharge. In particular, a negative electrode active material having a large change in volume due to charge or discharge like silicon materials such as silicon and silicon oxide is likely to cause the above problem.

The present invention has been made in view of the above circumstances and is intended to provide a nonaqueous electrolyte secondary battery having excellent output and cycle characteristics by reducing the deformation of an electrode assembly due to charge or discharge.

Solution to Problem

In order to solve the above problem, a nonaqueous electrolyte secondary battery according to an embodiment of the present invention includes a positive electrode plate including a positive electrode current collector and a positive electrode mixture layer, formed thereon, containing a positive electrode active material; a negative electrode plate including a negative electrode current collector and a negative electrode mixture layer, formed thereon, containing a negative electrode active material; a separator; a nonaqueous electrolyte; an outer can; and a sealing body. The positive electrode plate and the negative electrode plate are wound with the separator therebetween. The positive electrode active material contains a lithium-nickel composite oxide. The lithium-nickel composite oxide is represented by the formula $Li_aNi_bCo_cAl_dO_2$ ($0<a\le1.2$, $0.8\le b<1$, $0<c<0.2$, $0<d<0.05$, and $b+c+d=1$). The negative electrode active material contains graphite and a silicon material. The content of silicon oxide is 4% by mass to 20% by mass with respect to the sum of the masses of graphite and silicon oxide. The negative electrode plate includes negative electrode current collector-exposed portions, located at both ends thereof in a longitudinal direction, not covered by the negative electrode mixture layer. The negative electrode current collector-exposed portions are each connected to a negative electrode tab.

A nonaqueous electrolyte secondary battery according to another embodiment of present invention can use a lithium-nickel composite oxide represented by the formula $Li_aNi_bCo_cAl_dO_2$ ($0<a\le1.2$, $0.88\le b<1$, $0<c<0.12$, $0<d<0.05$, and $b+c+d=1$) as a positive electrode active material.

A nonaqueous electrolyte secondary battery according to another embodiment of present invention can use a lithium-nickel composite oxide represented by the formula $Li_aNi_bCo_cAl_dM_eO_2$ (M is at least one element selected from the group consisting of Fe, Cu, Mg, Ti, Zr, Ce, and W; $0<a\le1.2$; $0.8\le b<1$; $0<c<0.2$; $0<d<0.05$; $0<e<0.01$; and $b+c+d+e=1$) as a positive electrode active material.

A nonaqueous electrolyte secondary battery according to another embodiment of present invention can use a lithium-nickel composite oxide represented by the formula $Li_aNi_bCo_cAl_dM_eO_2$ (M is at least one element selected from the group consisting of Fe, Cu, Mg, Ti, Zr, Ce, and W; $0<a\le1.2$; $0.88\le b<1$; $0<c<0.12$; $0<d<0.05$; $0<e<0.01$; and $b+c+d+e=1$) as a positive electrode active material.

Silicon and silicon oxide can be used as a silicon material. Silicon oxide used is preferably silicon oxide represented by the formula $SiO_x$ ($0.5\le x<1.6$). Silicon can be used alone and is preferably used in the form of a composite of silicon and graphite or lithium silicate represented by the formula $Li_{2z}SiO_{(2+z)}$ ($0<z<2$).

Advantageous Effects of Invention

According to an embodiment of the present invention, a nonaqueous electrolyte secondary battery having excellent output and cycle characteristics can be provided.

DESCRIPTION OF EMBODIMENTS

Embodiments of the present invention are described in detail using experiment examples. The present invention is not limited to the embodiments below. Modifications can be appropriately made without departing from the scope of the present invention.

Experiment Example 1

(Preparation of Positive Electrode Active Material)

Lithium hydroxide was mixed with a nickel composite oxide represented by $Ni_{0.82}Co_{0.15}Al_{0.03}O_2$ such that the ratio of the number of moles of lithium element to the total number of moles of metal elements in the nickel composite oxide was 1.025. This mixture was fired at 750° C. for 18 hours in an oxygen atmosphere, whereby a lithium-nickel composite oxide represented by $LiNi_{0.82}Co_{0.15}Al_{0.03}O_2$ was prepared.

(Preparation of Positive Electrode Plate)

Figure 2:
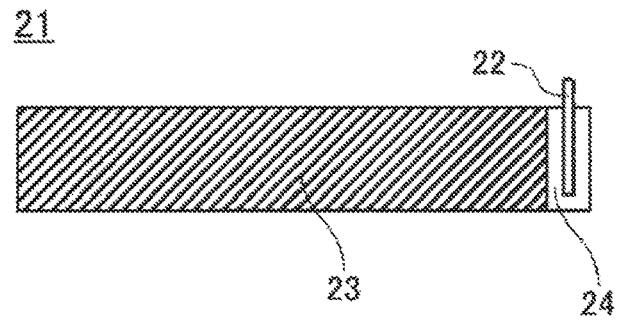
FIG. 2 is a plan view of a positive electrode plate according to an embodiment of the present invention.

The following materials were mixed together: 100 parts by mass of $LiNi_{0.82}Co_{0.15}Al_{0.03}O_2$ serving as a positive electrode active material, 1 part by mass of acetylene black serving as a conductive agent, and 0.9 parts by mass of polyvinylidene fluoride (PVDF) serving as a binding agent. This mixture was put into N-methyl-2-pyrrolidone (NMP) serving as a dispersion medium, followed by kneading, whereby positive electrode mixture slurry was prepared. The positive electrode mixture slurry was applied to both surfaces of a positive electrode current collector, made of aluminium, having a thickness of 15 µm by a doctor blade process, followed by drying, whereby positive electrode mixture layers 23 were formed. In this operation, a positive electrode current collector-exposed portion 24 not covered by the positive electrode mixture layers 23 was set at a position corresponding to an end portion of a completed positive electrode plate 21. The positive electrode mixture layers 23 were compressed with a roller and were cut to a predetermined size. Finally, a positive electrode tab 22 made of aluminium was connected to the positive electrode current collector-exposed portion 24, whereby the positive electrode plate 21 was prepared as shown in FIG. 2.

(Preparation of Negative Electrode Active Material)

A silicon material used was silicon oxide having the composition SiO (corresponding to the formula $SiO_x$, where $x=1$). SiO was heated in an inert gas atmosphere containing a hydrocarbon gas and particles of SiO were surface-coated with carbon by a chemical vapor deposition (CVD) process in such a manner that the hydrocarbon gas was pyrolyzed. The coating amount of carbon was 10% by mass with respect to the mass of SiO. Next, the SiO particles coated with carbon was subjected to a disproportionation reaction at 1,000° C. in an inert gas atmosphere such that a fine Si phase and $SiO_2$ phase were formed in the SiO particles, followed by classification to a predetermined particle size, whereby SiO used for a negative electrode active material was obtained. SiO was mixed with graphite such that the content of SiO was 5% by mass with respect to the sum of the masses of graphite and SiO, whereby the negative electrode active material was prepared.

(Preparation of Negative Electrode Plate)

Figure 3:
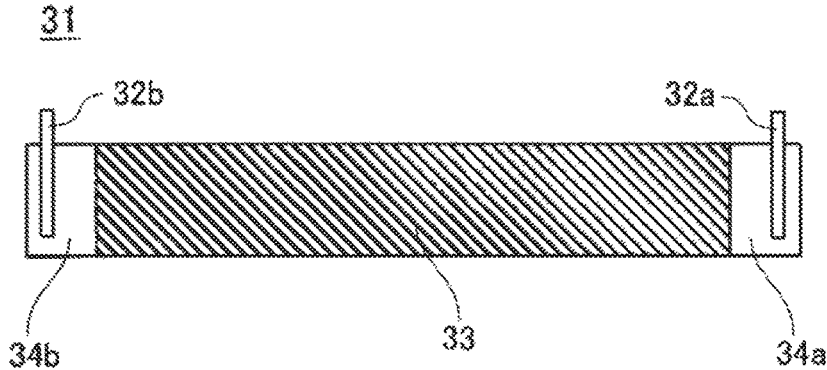
FIG. 3 is a plan view of a negative electrode plate according to an embodiment of the present invention.

Into water serving as a dispersion medium, 97 parts by mass of the negative electrode active material, 1.5 parts by mass of carboxymethylcellulose (CMC) serving as a thickening agent, and 1.5 parts by mass of styrene-butadiene rubber (SBR) serving as a binding agent were put, followed by kneading, whereby negative electrode mixture slurry was prepared. The negative electrode mixture slurry was applied to both surfaces of a negative electrode current collector, made of copper, having a thickness of 8 µm by a doctor blade process, followed by drying, whereby negative electrode mixture layers 33 were formed. In this operation, negative electrode current collector-exposed portions 34a and 34b not covered by the negative electrode mix layers 33 were set at positions corresponding to both ends of a completed negative electrode plate 31. The negative electrode mixture layers 33 were compressed with a roller and were cut to a predetermined size. Finally, negative electrode tabs 32a and 32b were connected to the negative electrode current collector-exposed portions 34a and 34b, respectively, whereby the negative electrode plate 31 was prepared as shown in FIG. 3. The negative electrode tab 32a was located on the winding start side of the negative electrode plate 31 and was made of a cladding material having a nickel-copper two-layer structure. The negative electrode tab 32b was located on the winding end side of the negative electrode plate 31 and was made of a cladding material having a nickel-copper-nickel three-layer structure.

(Preparation of Electrode Assembly)

The positive electrode plate 21 and negative electrode plate 31 prepared as described above were wound with a separator 11, composed of a polyethylene microporous membrane, therebetween using a core bar, followed by removing the core bar, whereby an electrode assembly 14 having a hollow portion 15 was prepared.

(Preparation of Nonaqueous Electrolyte)

Ethylene carbonate (EC) and dimethyl carbonate (DMC) were mixed at a volume ratio of 30:70 (1 atm, 25° C.), whereby a nonaqueous solvent was prepared. Lithium hexafluorophosphate ($LiPF_6$) serving as an electrolyte salt was dissolved in the nonaqueous solvent at a concentration of 1 mol/L, whereby a nonaqueous electrolyte was prepared.

(Preparation of Nonaqueous Electrolyte Secondary Battery)

Figure 1:
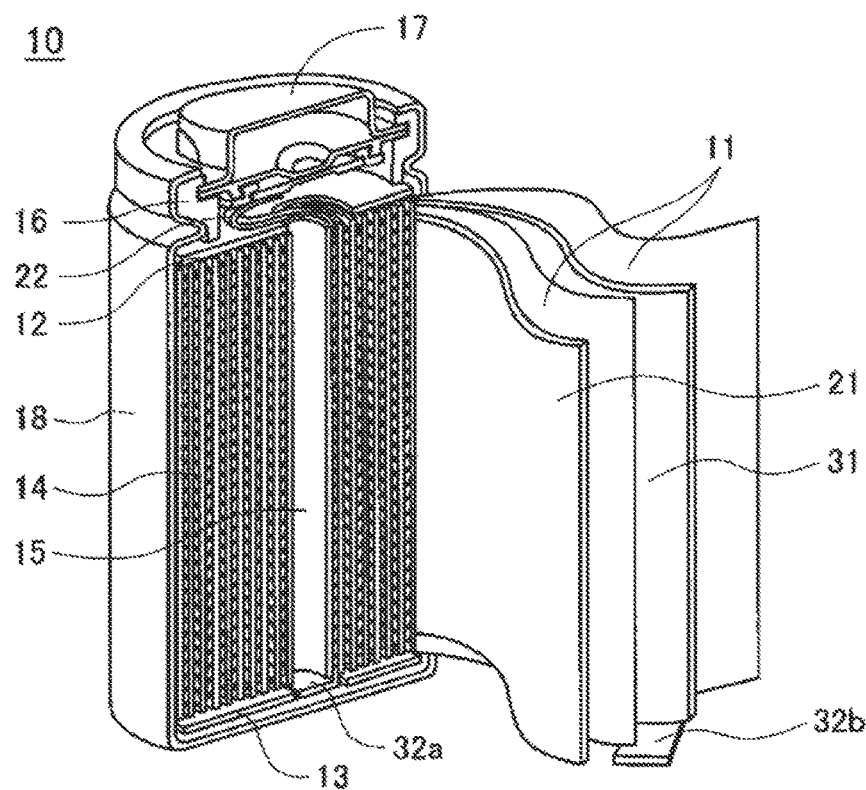
FIG. 1 is a cross-sectional perspective view of a nonaqueous electrolyte secondary battery according to an embodiment of the present invention.

An upper insulating plate 12 and a lower insulating plate 13 were provided on the top and bottom, respectively, of the electrode assembly 14. Next, the negative electrode tab 32a, which was connected to the winding start side of the negative electrode plate 31, was bent in the central direction of the electrode assembly 14. Thereafter, the negative electrode tab 32b, which was connected to the winding end side of the negative electrode plate 31, was bent so as to overlap the negative electrode tab 32a at the center of the electrode assembly 14 and the electrode assembly 14 was housed in an outer can 18. The negative electrode tabs 32a and 32b were welded to the outer can 18 by resistance welding using a pair of electrodes. In particular, one of the electrodes was inserted into the hollow portion 15, which corresponded to a core portion of the electrode assembly 14, so as to be located on the negative electrode tab 32a, the other electrode was applied to the center of a bottom portion of the outer can 18, and a voltage was applied between the electrodes. This allowed a contact between a nickel layer of the negative electrode tab 32a and a nickel layer of the negative electrode tab 32b and a contact between a nickel layer of the negative electrode tab 32b and the bottom portion of the outer can 18 to be welded. The positive electrode tab 22 was connected to a sealing body 17. After the nonaqueous electrolyte was poured into the outer can 18, the sealing body 17 was fixed to an opening of the outer can 18 by swaging with a gasket 16 therebetween, whereby a nonaqueous electrolyte secondary battery 10 having a diameter of 18 mm and a height of 65 mm was prepared as shown in FIG. 1.

Experiment Example 2

A nonaqueous electrolyte secondary battery according to Experiment Example 2 was prepared in substantially the same manner as that used in Experiment Example 1 except for using a lithium-nickel composite oxide represented by $LiNi_{0.88}Co_{0.09}Al_{0.03}O_2$ as a positive electrode active material.

Experiment Example 3

A nonaqueous electrolyte secondary battery according to Experiment Example 3 was prepared in substantially the same manner as that used in Experiment Example 1 except for using a lithium-nickel composite oxide represented by $LiNi_{0.91}Co_{0.06}Al_{0.03}O_2$ as a positive electrode active material.

Experiment Example 4

A nonaqueous electrolyte secondary battery according to Experiment Example 4 was prepared in substantially the same manner as that used in Experiment Example 2 except that the content of SiO was 4% by mass with respect to the sum of the masses of graphite and SiO.

Experiment Example 5

A nonaqueous electrolyte secondary battery according to Experiment Example 5 was prepared in substantially the same manner as that used in Experiment Example 2 except that the content of SiO was 7% by mass with respect to the sum of the masses of graphite and SiO.

Experiment Example 6

A nonaqueous electrolyte secondary battery according to Experiment Example 6 was prepared in substantially the same manner as that used in Experiment Example 2 except that the content of SiO was 10% by mass with respect to the sum of the masses of graphite and SiO.

Experiment Example 7

A nonaqueous electrolyte secondary battery according to Experiment Example 7 was prepared in substantially the same manner as that used in Experiment Example 2 except for using polycrystalline silicon (Si) with an average particle diameter (median diameter D50) of 5 μm instead of SiO coated with carbon.

Experiment Example 8

(Preparation of Silicon-Graphite Composite)

In a nitrogen atmosphere, monocrystalline Si particles were put into methylnaphthalene serving as a solvent together with a bead mill and were wet-milled so as to have an average particle diameter (median diameter D50) of 0.2 μm, whereby silicon-containing slurry was prepared. Graphite particles and carbon pitch were added to the silicon-containing slurry, followed by mixing and carbonizing the carbon pitch. The product was classified so as to have a particle diameter in a predetermined range, followed by adding carbon pitch. The carbon pitch was carbonized, whereby a silicon-graphite composite in which the Si particles and the graphite particles were bound with amorphous carbon was prepared. The content of silicon in this composite was 20.9% by mass.

A nonaqueous electrolyte secondary battery according to Experiment Example 8 was prepared in substantially the same manner as that used in Experiment Example 2 except for using the silicon-graphite composite prepared as described above instead of SiO coated with carbon.

Experiment Example 9

(Preparation of Silicon-Lithium Silicate Composite)

In an inert gas atmosphere, Si particles and lithium silicate ($Li_2SiO_3$) particles were mixed at a mass ratio of 42:58 and the mixture was milled in a planetary ball mill. The particles milled in the inert gas atmosphere were taken out and were then heat-treated at 600° C. for 4 hours in an inert gas atmosphere. The heat-treated particles (hereinafter referred to as the core particles) were milled and were mixed with coal pitch, followed by heat treatment at 800° C. for 5 hours in an inert gas atmosphere, whereby a conductive layer of carbon was formed on the surface of each core particle. The content of carbon contained in the conductive layer was 5% by mass with respect to the sum of the masses of the core particle and the conductive layer. Finally, the core particles were classified, whereby a silicon-lithium silicate composite with an average particle diameter of 5 μm was obtained.

(Analysis of Silicon-Lithium Silicate Composite)

A cross section of the silicon-lithium silicate composite was observed with a scanning electron microscope (SEM). As a result, the average diameter of the Si particles contained in the composite was less than 100 nm. Furthermore, it was confirmed that the Si particles were uniformly dispersed in a $Li_2SiO_3$ phase. In an XRD pattern of the silicon-lithium silicate composite, a diffraction peak assigned to each of Si and $Li_2SiO_3$ was observed. The full width at half maximum of the plane indices (111) of $Li_2SiO_3$ that was found at 2θ=27° in the XRD pattern was 0.233. In the XRD pattern, no peak assigned to $SiO_2$ was observed. The content of $SiO_2$ measured by Si-NMR was below the lower limit of detection.

A nonaqueous electrolyte secondary battery according to Experiment Example 9 was prepared in substantially the same manner as that used in Experiment Example 2 except for using the silicon-lithium silicate composite prepared as described above instead of SiO coated with carbon.

Experiment Example 10

A nonaqueous electrolyte secondary battery according to Experiment Example 10 was prepared in substantially the same manner as that used in Experiment Example 1 except that the content of SiO was 2% by mass with respect to the sum of the masses of graphite and SiO.

Experiment Example 11

A nonaqueous electrolyte secondary battery according to Experiment Example 11 was prepared in substantially the same manner as that used in Experiment Example 1 except for using a lithium-nickel composite oxide represented by $LiNi_{0.5}Co_{0.2}Mn_{0.3}O_2$ as a positive electrode active material.

Experiment Example 12

A nonaqueous electrolyte secondary battery according to Experiment Example 12 was prepared in substantially the same manner as that used in Experiment Example 1 except that a negative electrode tab 32a was not connected to a negative electrode current collector-exposed portion 34a.

(Cycle Test)

The battery according to each of Experiment Examples 1 to 12 was charged with a constant current of 1,500 mA in a 25° C. environment until the voltage of the battery reached 4.2 V. Thereafter, the battery was charged with a constant voltage of 4.2 V until the current reached 60 mA. Next, the battery was discharged with a constant current of 10 A until the battery voltage reached 2.5 V. The charge-discharge was repeated for 100 cycles.

(Measurement of Cross-Sectional Area of Hollow Portion in Electrode Assembly)

A cross section of the battery according to each of Experiment Examples 1 to 12 was photographed by X-ray computerized tomography (CT) before and after a cycle test, the cross section being perpendicular to the winding axis of the electrode assembly 14. The cross-sectional area of the hollow portion 15 of the battery was measured from an obtained photograph. The electrode assembly strain was calculated from the following equation using the cross-sectional area A1 of the hollow portion 15 before the cycle test and the cross-sectional area A2 of the hollow portion 15 after the cycle test:

Electrode assembly strain (%)=(A1−A2)÷A1×100

Obtained results are summarized in Table 1.

TABLE 1

| | Positive electrode | Negative electrode | | | Electrode |
| --- | --- | --- | --- | --- | --- |
| | Positive electrode active material | Si material | Content of Si material | Number of tabs | assembly strain |
| Experiment Example 1 | $LiNi_{0.82}Co_{0.15}Al_{0.03}O_2$ | SiO | 5% by mass | 2 | 21% |
| Experiment Example 2 | $LiNi_{0.88}Co_{0.09}Al_{0.03}O_2$ | SiO | 5% by mass | 2 | 15% |
| Experiment Example 3 | $LiNi_{0.91}Co_{0.06}Al_{0.03}O_2$ | SiO | 5% by mass | 2 | 7% |
| Experiment Example 4 | $LiNi_{0.88}Co_{0.09}Al_{0.03}O_2$ | SiO | 4% by mass | 2 | 13% |
| Experiment Example 5 | $LiNi_{0.88}Co_{0.09}Al_{0.03}O_2$ | SiO | 7% by mass | 2 | 22% |
| Experiment Example 6 | $LiNi_{0.88}Co_{0.09}Al_{0.03}O_2$ | SiO | 10% by mass | 2 | 41% |
| Experiment Example 7 | $LiNi_{0.88}Co_{0.09}Al_{0.03}O_2$ | Si | 5% by mass | 2 | 18% |
| Experiment Example 8 | $LiNi_{0.88}Co_{0.09}Al_{0.03}O_2$ | Si-graphite composite | 5% by mass | 2 | 16% |
| Experiment Example 9 | $LiNi_{0.88}Co_{0.09}Al_{0.03}O_2$ | Si-$Li_2SiO_3$ composite | 5% by mass | 2 | 13% |
| Experiment Example 10 | $LiNi_{0.82}Co_{0.15}Al_{0.03}O_2$ | SiO | 2% by mass | 2 | 18% |
| Experiment Example 11 | $LiNi_{0.5}Co_{0.2}Mn_{0.3}O_2$ | SiO | 5% by mass | 2 | 55% |
| Experiment Example 12 | $LiNi_{0.82}Co_{0.15}Al_{0.03}O_2$ | SiO | 5% by mass | 1 | 6% |

As is clear from Table 1, Experiment Examples 1 to 10 exhibit reduced electrode assembly strain as compared to Experiment Example 11. This result shows that cobalt and aluminium need to be constituent elements of each lithium-nickel composite oxide. The reason why the electrode assembly strain is reduced is not clear but is probably because a positive electrode plate containing a lithium-cobalt composite oxide containing cobalt and aluminium as a positive electrode active material exhibits the physical effect of buffering the deformation of a negative electrode due to charge or discharge.

Comparing results of Experiment Examples 1 to 3 shows that the increase in nickel content of each lithium-nickel composite oxide reduces the electrode assembly strain. In particular, Experiment Example 3, in which the nickel content of the lithium-nickel composite oxide is 91% by mole, exhibits an electrode assembly strain substantially equal to that of Experiment Example 12, in which a single negative electrode tab only is used. The reason for this is not clear but is probably as follows. With the increase in content of nickel, a NiO phase is likely to be formed on the surface of a positive electrode active material. The NiO phase affects the electronic conductivity and ionic conductivity of a lithium-nickel composite oxide. Therefore, the increase in amount of nickel affects the behavior of a negative electrode in the final stage of charge or discharge controlled by the battery voltage and acts to reduce the deformation of an electrode assembly. However, Mn in a positive electrode active material suppresses the formation of NiO. Therefore, the electrode assembly strain of Experiment Example 11 is probably increased.

From the above results, the content of nickel in a lithium-nickel composite oxide is preferably 80% by mole or more and more preferably 88% by mole or more.

Comparing results of Experiment Examples 3 to 6 shows that the increase in content of SiO increases the electrode assembly strain. With the increase in content of SiO, which varies greatly in volume during charge and discharge, the increase of the electrode assembly strain is inevitable. However, even when the content of SiO is high, the following effect is exhibited: the effect of reducing the electrode assembly strain by using a predetermined lithium-nickel composite oxide for a silicon material in a negative electrode active material as a positive electrode active material. Therefore, the upper limit of the content of SiO is not particularly limited and the content of SiO is preferably 20% by mass or less with respect to the sum of the masses of graphite and the silicon material and more preferably 10% by mass or less. The lower limit of the content of SiO is also not particularly limited. In order to obtain a high-capacity nonaqueous electrolyte secondary battery, the content of SiO is preferably 4% by mass or more.

Experiment Examples 7 to 9, in which silicon or the composite containing silicon is used, exhibit an electrode assembly strain substantially equal to that of Experiment Example 2, in which SiO is used. In the case of using silicon alone or in the form of a composite as described above, the electrode assembly strain is suppressed as is the case with SiO.

The embodiments of the present invention are further described with reference to the above experiment results.

A lithium-nickel composite oxide serving as a positive electrode active material needs to contain cobalt and aluminium as constituent elements. The nickel content of the lithium-nickel composite oxide is preferably 80% by mole or more. Therefore, a lithium-nickel composite oxide according to an embodiment of the present invention can be represented by the formula $Li_aNi_bCo_cAl_dO_2$ ($0<a\leq1.2$, $0.8\leq b<1$, $0<c<0.2$, $0<d<0.05$, and $b+c+d=1$).

The results of the experiment examples show that the nickel content of the lithium-nickel composite oxide is more preferably 88% by mole or more. Therefore, a lithium-nickel composite oxide according to another embodiment of the present invention can be represented by the formula $Li_aNi_bCo_cAl_dO_2$ ($0<a\leq1.2$, $0.88\leq b<1$, $0<c<0.12$, $0<d<0.05$, and $b+c+d=1$).

In the above formulas, a, which represents the content of Li, is set within the above range in consideration of the fact that a varies during charge and discharge. In nonaqueous electrolyte secondary batteries immediately after being prepared, a preferably satisfies $0.95\leq a\leq1.2$.

In the present invention, a lithium-nickel composite oxide may contain at least one element selected from the group consisting of Fe, Cu, Mg, Ti, Zr, Ce, and W instead of any of Ni, Co, and Al. The total content of these elements is preferably less than 1% by mole with respect to the number of moles of metal elements, excluding lithium, in the lithium-nickel composite oxide. This enables the safety of nonaqueous electrolyte secondary batteries to be improved. Incidentally, the above formulas do not exclude any impurity element inevitably contained in the lithium-nickel composite oxides.

A silicon material used may be silicon oxide. Silicon oxide used is preferably silicon oxide represented by the formula $SiO_x$ ($0.5\leq x<1.6$). When x is less than 0.5, the proportion of Si in $SiO_x$ is large. Therefore, the dilatation and shrinkage of a negative electrode active material during charge and discharge are excessively large to reduce cycle characteristics. When x is 1.6 or more, the irreversible capacity of a negative electrode during initial charge and discharge is large and therefore the battery capacity is reduced. Therefore, x is preferably 0.5 to less than 1.6.

$SiO_x$ has lower electronic conductivity as compared to graphite. Therefore, the surface of $SiO_x$ is preferably coated with carbon as shown in the experiment examples. The coating amount of carbon is preferably 0.1% by mass to 10% by mass with respect to $SiO_x$. However, it is not necessarily essential that the surface of $SiO_x$ is coated with carbon, in the case where the surface of $SiO_x$ is not coated with carbon, effects of the present invention are sufficiently exhibited.

The silicon material used may be silicon alone or a composite of silicon and another material. Silicon used may be any of microcrystalline silicon, polycrystalline silicon, and amorphous silicon. Polycrystalline silicon with a grain size of 60 nm or less and amorphous silicon are preferable. Using such silicon reduces the cracking of particles during charge and discharge to enhance cycle characteristics. The average particle diameter (median diameter D50) of silicon is preferably 0.1 μm to 10 μm and more preferably 0.1 μm to 5 μm. Techniques for obtaining silicon having such an average particle diameter include dry milling processes using a jet mill or a ball mill and wet milling processes using a bead mill or a ball mill. Silicon may be alloyed with at least one metal element selected from the group consisting of nickel, copper, cobalt, chromium, iron, silver, titanium, molybdenum, and tungsten.

As a material that forms a composite together with silicon, a material having the effect of absorbing the significant change in volume of silicon due to charge or discharge is preferably used. Examples of such a material include graphite and lithium silicate.

In a silicon-graphite composite, silicon particles and graphite particles are preferably bound to each other with amorphous carbon as shown in Experiment Example 8. The graphite particles used may be particles of any of synthetic graphite and natural graphite. As a precursor of amorphous carbon used to bind the silicon particles and the graphite particles together, a pitch material, a tar material, and a resin material can be used. Examples of the resin material include vinyl resins, cellulose resins, and phenol resins. These amorphous carbon precursors can be converted into amorphous carbon by heat treatment at 700° C. to 1,300° C. in an inert gas atmosphere. In the case where the silicon particles and the graphite particles are bound together with amorphous carbon, amorphous carbon is included in components of the silicon-graphite composite. The content of silicon in the silicon-graphite composite is preferably 10% by mass to 60% by mass.

A silicon-lithium silicate composite preferably has a structure in which silicon particles are dispersed in a lithium silicate phase as shown in Experiment Example 9. The surface of the silicon-lithium silicate composite, as well as $SiO_x$, may be coated with carbon. In this case, carbon is an arbitrary component and is not any component of the silicon-lithium silicate composite. The content of silicon in the silicon-lithium silicate composite is preferably 40% by mass to 60% by mass.

Incidentally, $SiO_x$ microscopically has a structure in which Si particles are dispersed in a matrix made of $SiO_2$. It is conceivable that the $SiO_2$ acts to absorb the expansion and contraction of Si during charge and discharge. However, in the case of using $SiO_x$ in a negative electrode active material, $SiO_2$ reacts with lithium (Li) as shown by Equation (1).

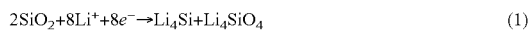

$$2SiO_2 + 8Li^+ + 8e^- \rightarrow Li_4Si + Li_4SiO_4 \quad (1)$$

$Li_4SiO_4$, which is formed by the reaction of $SiO_2$ with Li, cannot reversibly intercalate or deintercalate lithium. Therefore, the irreversible capacity due to the formation of $Li_4SiO_4$ during the first charge is accumulated in a negative electrode containing $SiO_x$ as a negative electrode active material. However, unlike $SiO_x$, lithium silicate does not cause any chemical reaction accumulating irreversible capacity and therefore can absorb the change in volume of Si during charge and discharge without reducing the initial charge/discharge efficiency of the negative electrode.

Lithium silicate used is not limited to $Li_2SiO_3$ shown in Experiment Example 9 and may be lithium silicate represented by the formula $Li_{2z}SiO_{(2+z)}$ (0<z<2). In an XRD pattern, the full width at half maximum of the diffraction peak corresponding to the (111) plane of lithium silicate is preferably 0.05° or more. This further enhances the lithium ion conductivity in particles of the silicon-lithium silicate composite and the effect of absorbing the change in volume of Si.

Examples of graphite used as a negative electrode active material include synthetic graphite and natural graphite, which may be used alone or in combination. The surface of graphite may be coated with carbon.

A separator used may be a microporous membrane made of a polyolefin such as polyethylene (PE) or a polypropylene (PP). The microporous membrane may be used in the form of a single layer or a stack of two or more layers. In a layered separator composed of two or more layers, it is preferable that an intermediate layer is made of polyethylene (PE) having a low melting point and a surface layer is made of polypropylene (PP) having excellent oxidation resistance. The separator may contain inorganic particles such as aluminum oxide ($Al_2O_3$), titanium oxide ($TiO_2$), and silicon oxide ($SiO_2$). The inorganic particles may be supported in the separator or may be applied to a surface of the separator together with a binding agent. An aramid resin may be applied to a surface of the separator.

A nonaqueous electrolyte used may be one obtained by dissolving a lithium salt serving as an electrolyte salt in a nonaqueous solvent. A nonaqueous electrolyte containing a gelled polymer instead of or together with the nonaqueous solvent can be used.

The nonaqueous solvent used may be any of cyclic carbonates, linear carbonates, cyclic carboxylates, and linear carboxylates, which are preferably used in combination. Examples of the cyclic carbonates include ethylene carbonate (EC), propylene carbonate (PC), and butylene carbonate (BC). A cyclic carbonate, such as fluoroethylene carbonate (FEC), in which hydrogen is partially substituted with fluorine can be used. Examples of the linear carbonates include dimethyl carbonate (DMC), ethyl methyl carbonate (EMC), diethyl carbonate (DEC), and methyl propyl carbonate (MPC). Examples of the cyclic carboxylates include γ-butyrolactone (γ-BL) and γ-valerolactone (γ-VL). Examples of the linear carboxylates include methyl pivalate, ethyl pivalate, methyl isobutyrate, and methyl propionate.

Examples of the lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$. Among these, $LiPF_6$ is particularly preferable. The concentration of $LiPF_6$ in the nonaqueous electrolyte is preferably 0.5 mol/L to 2.0 mol/L. $LiPF_6$ may be mixed with another lithium salt such as $LiBF_4$.

In each experiment example, the nonaqueous electrolyte secondary battery, which is cylindrical, has been exemplified. In the case of using a prismatic nonaqueous electrolyte secondary battery, effects of the present invention are equally exhibited. That is, a bottomed cylindrical outer can according to the present invention includes cylindrical outer cans and prismatic outer cans.

INDUSTRIAL APPLICABILITY

According to the present invention, a nonaqueous electrolyte secondary battery having excellent output characteristics and excellent cycle characteristics can be provided. Therefore, the industrial applicability of the present invention is significant.

REFERENCE SIGNS LIST

10 Nonaqueous electrolyte secondary battery
11 Separator
12 Upper insulating plate
13 Lower insulating plate
14 Electrode assembly
15 Hollow portion
16 Gasket
17 Sealing body
18 Outer can
21 Positive electrode plate
22 Positive electrode tab
23 Positive electrode mixture layers
24 Positive electrode current collector-exposed portion
31 Negative electrode plate
32a, 32b Negative electrode tab
33 Negative electrode mixture layers
34a, 34b Negative electrode current collector-exposed portion

The invention claimed is:
1. A nonaqueous electrolyte secondary battery comprising a positive electrode plate including a positive electrode current collector and a positive electrode mixture layer, formed thereon, containing a positive electrode active material; a negative electrode plate including a negative electrode current collector and a negative electrode mixture layer, formed thereon, containing a negative electrode active material; a separator; a nonaqueous electrolyte; an outer can; and a sealing body, wherein the positive electrode plate and the negative electrode plate are wound with the separator therebetween;

the positive electrode active material contains a lithium-nickel composite oxide;

the lithium-nickel composite oxide is represented by the formula $Li_aNi_bCo_cAl_dO_2$ ($0<a\leq1.2$, $0.8\leq b<1$, $0<c<0.2$, $0<d<0.05$, and $b+c+d=1$);

the negative electrode active material contains graphite and a silicon material;

the negative electrode plate having two short sides and two long sides, wherein the two short sides oppose each other in a longitudinal direction, and each short side of said two short sides include a negative electrode current collector exposed portion not covered by the negative electrode mixture layer; and the negative electrode current collector-exposed portions are each connected to a negative electrode tab.

2. The nonaqueous electrolyte secondary battery according to claim 1, wherein the lithium-nickel composite oxide is represented by the formula $Li_aNi_bCo_cAl_dO_2$ ($0<a\leq1.2$, $0.88\leq b<1$, $0<c<0.12$, $0<d<0.05$, and $b+c+d=1$).

3. The nonaqueous electrolyte secondary battery according to claim 1, wherein the silicon material is represented by the formula $SiO_x$ ($0.5\leq x<1.6$).

4. The nonaqueous electrolyte secondary battery according to claim 1, wherein the silicon material is a composite in which silicon particles and graphite particles are bound to each other with amorphous carbon.

5. The nonaqueous electrolyte secondary battery according to claim 1, wherein the silicon material is a composite in which silicon particles are dispersed in a lithium silicate phase represented by the formula $Li_{2z}SiO_{(2+z)}$ ($0<z<2$).

6. The nonaqueous electrolyte secondary battery according to claim 3, wherein the content of the silicon material is 4% by mass to 20% by mass with respect to the sum of the masses of the graphite and the silicon material.

7. The nonaqueous electrolyte secondary battery according to any one of claim 4, wherein the content of the silicon material is 4% by mass to 20% by mass with respect to the sum of the masses of the graphite and the silicon material.

8. The nonaqueous electrolyte secondary battery according to any one of claim 5, wherein the content of the silicon material is 4% by mass to 20% by mass with respect to the sum of the masses of the graphite and the silicon material.

* * * * *